United States Patent [19]
Beukema

[11] Patent Number: 5,408,357
[45] Date of Patent: Apr. 18, 1995

[54] DISPLAY DEPOLARIZER

[75] Inventor: Jack A. Beukema, Holland, Mich.

[73] Assignee: Prince Corporation, Holland, Mich.

[21] Appl. No.: 973,680

[22] Filed: Nov. 9, 1992

[51] Int. Cl.⁶ ............................................. G02R 27/28
[52] U.S. Cl. ................................. 359/493; 359/839;
    359/884; 359/872; 362/83.1; 345/7
[58] Field of Search .................. 340/705; 362/83.1;
    359/838, 839, 884, 872, 871, 804, 493, 494;
    345/7, 8

[56] References Cited

U.S. PATENT DOCUMENTS

| 328,587 | 8/1892 | Arbisi . | |
|---|---|---|---|
| 2,292,606 | 8/1942 | Briggs | 359/608 |
| 4,340,646 | 7/1982 | Ohno et al. | 359/884 |
| 4,367,014 | 1/1983 | Howden | 356/72 |
| 4,419,397 | 12/1983 | Neat et al. | 428/141 |
| 4,605,292 | 8/1986 | McIntosh | 359/884 |
| 5,037,182 | 8/1991 | Groves et al. | 359/838 |

OTHER PUBLICATIONS

Roberts et al, U.S. Statutory Invention Registration, H1109, Oct. 6, 1992.

*Primary Examiner*—Georgia Y. Epps
*Assistant Examiner*—Thomas Robbins
*Attorney, Agent, or Firm*—Price, Heneveld, Cooper, DeWitt & Litton

[57] ABSTRACT

A high-contrast reflective display for use under high ambient light conditions for individuals wearing sunglasses and particularly polarized sunglasses includes a reflective target for a light emitting source of information to be displayed. The target is a relatively thin transparent polymeric film having a metalized rear reflective surface. The film, in a preferred embodiment, is a Mylar film having a thickness of from about 0.001–0.005 inches with a neutral density tint. The metal coating was aluminum vacuumed deposited on the film layer. The composite target can be adhered to a support using a suitable bonding adhesive applied to the metalized film.

15 Claims, 2 Drawing Sheets

DISPLAY DEPOLARIZER

BACKGROUND OF THE INVENTION

The present invention pertains to a reflective display for use in a vehicle for preventing polarization of the reflected image of the displayed information such that a viewer wearing polarized sunglasses can see the information being displayed.

There exists a variety of modern display systems for displaying to a vehicle operator or occupants of a vehicle such as an automobile, information as to the vehicle operating status. Such displays include, for example, heads-up displays which are projected on the windshield, vacuum-fluorescent displays included directly in the instrument panel, liquid crystal displays, and reflective displays used in connection with vehicle accessories such as overhead consoles or rearview mirrors. U.S. Pat. application Ser. No. 07/567,390, filed Aug. 14, 1990, entitled ELECTRICAL CONTROL SYSTEM FOR VEHICLE OPTIONS, discloses the latter type of reflective display for use in a rearview mirror assembly. U.S. patent application Ser. No. 07/745,454, filed Aug. 14, 1991, entitled REFLECTIVE DISPLAY AT INFINITY, discloses a display which can be incorporated into a vehicle overhead console.

In displays employed in high ambient light conditions, such as encountered in vehicles such as automobiles during daylight use and particularly displays located in the upper windshield area where incoming sunlight tends to interfere with a display presentation, it is necessary to provide a relatively high-contrast display so that a vehicle operator can clearly see a display even under such interfering high ambient light. This has been achieved by employing a reflective shiny surfaced, black polycarbonate or acrylic material which receives the reversed image source information from a vacuum-fluorescent display and reflects such information to provide the vehicle operator with a relatively bright and contrast display.

In relatively small vehicle accessories, such as a rearview mirror housing and compact overhead consoles, it is desirable to provide a reflective display which allows the display of information from, for example, a vacuum-fluorescent source, to be positioned within a housing and a reflective target positioned on the outer edge of the housing for compact packaging of such accessories including displays. In rearview mirrors, this compact packaging structure does not detract from the available surface area of the rearview mirror itself. In providing a reflective display with a light source located, for example, below the target, it is necessary to align the target at an angle of approximately 45° to project the image to the viewer's eyes. This angle is relatively close to Brewster's Angle for polymeric material used as a target in which the parallel (sometimes referred to as vertical) component of the light is almost totally absorbed reflecting only the perpendicular (sometimes referred to as horizontal) component of reflected light. As a result, in such display systems the light reflected from the target to the viewer's eyes is polarized and comprises substantially only the perpendicular component. The serendipitous discovery of this problem became apparent only when one wearing sunglasses which were polarized could not see the display.

Thus, it was discovered that the utilization of an angled reflective black acrylic or other polymeric material as a target, although providing a high-contrast display usable under most light conditions, also polarizes the light received and reflects primarily only the perpendicular component of incident light. As a result, if an individual is wearing polarized sunglasses, as frequently occurs in high ambient sunlight conditions, the display information is blocked out by the interfering polarization patterns of the polarized sunglasses and the polarizing effect of the reflective material. The unfortunate result is that the display is not visible to an individual wearing polarized sunglasses.

SUMMARY OF THE PRESENT INVENTION

The present invention overcomes the challenge of providing a high-contrast reflective display for use under high ambient light conditions, and yet maintains the display visible for individuals wearing sunglasses and particularly polarized sunglasses. The display of the present system provides a reflective target for a light emitting source of information to be displayed, such as a vacuum-fluorescent display or other suitable, high intensity display sources. The target includes a backing structure to which there is mounted a relatively thin, transparent, polymeric film having a metalized rear reflective surface. The film in a preferred embodiment is tinted to provide a relatively dark appearing target which provides a high-contrast image. The utilization of the reflective metal surface and a relatively thin polymeric layer prevents significant polarization of the light thereby reflecting to the viewer's eyes unpolarized light including both perpendicular and paralleled components.

In a preferred embodiment, the film employed was a Mylar film having a thickness of from about 0.001–0.005 inch with a neutral density tint. The metal coating was an aluminum coating. In the preferred embodiment, the aluminum coating was vacuumed deposited on the film layer and the composite adhered to a support using a suitable bonding adhesive.

The resultant reflective target provides a high-contrast display which is suitable for use in high ambient light conditions such as incurred at the upper portion of a vehicle windshield where incident sunlight can be bothersome and yet prevents the display from being obliterated by the user of polarized sunglasses by vehicle occupants. These and other features, objects and advantages of the present invention will become apparent upon reading the following description thereof together with reference to the accompanying drawings in which:

DETAILED DESCRIPTION OF THE PREFERRED EMBODIMENT

Figure 1:
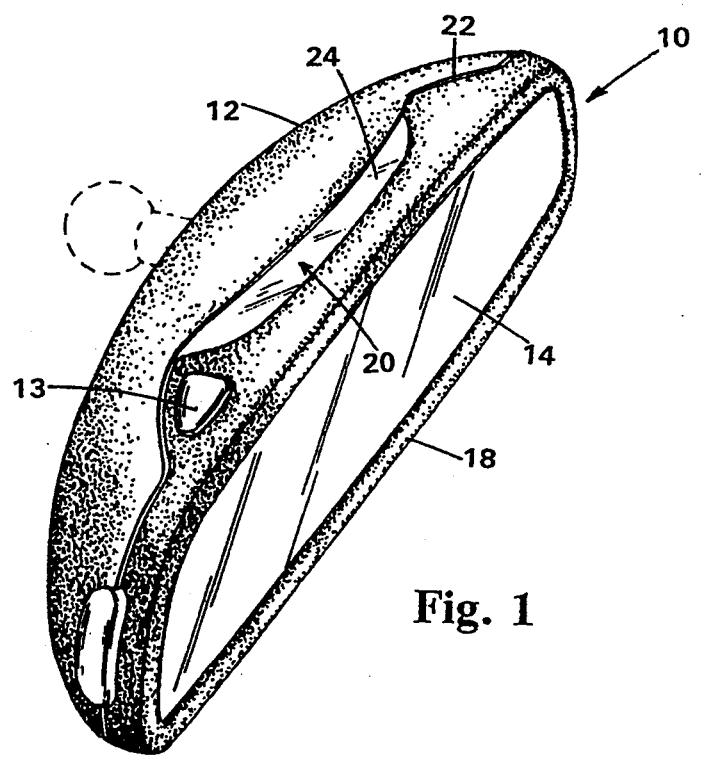
FIG. 1 is a perspective view of a vehicle accessory such as a rearview mirror embodying the present invention.
Figure 2:
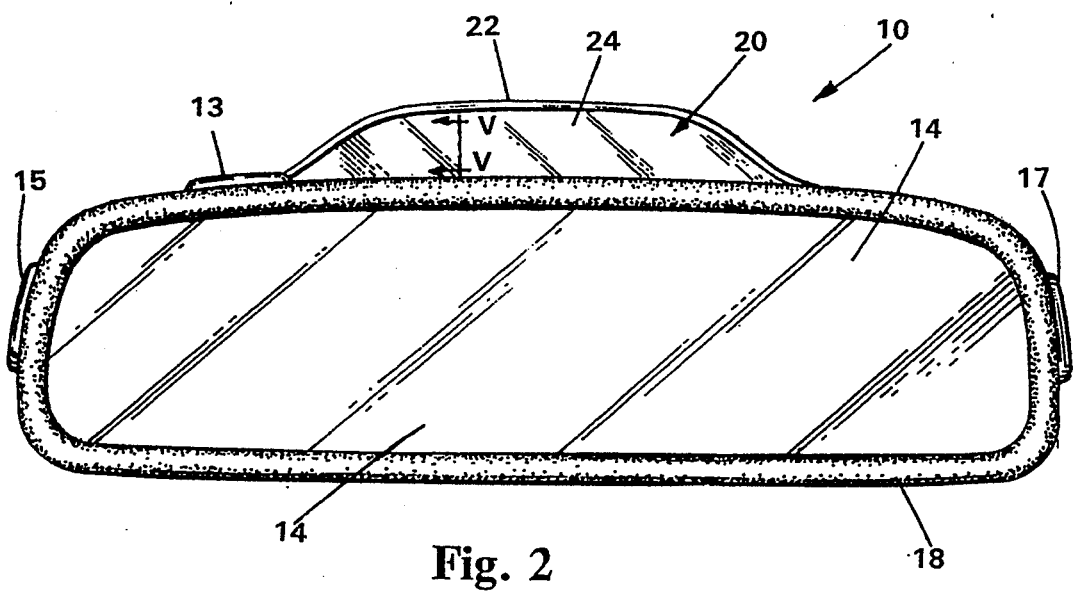
FIG. 2 is a front elevational view of the structure shown in FIG. 1.

Referring initially to FIGS. 1 and 2, there is shown a vehicle accessory 10 such as a rearview mirror which includes a generally concave mirror housing 12 mounted to the vehicle by a mounting assembly 14 of generally conventional design. The mirror housing includes, as disclosed in greater detail in U.S. patent application Ser. No. 07/567,390, identified above, the disclosure of which is incorporated herein by reference, an electronic package including an electrical compass and temperature measuring circuit for displaying on a display 20, direction heading information, temperature information or other vehicle operating parameter information to the vehicle operator and/or passenger. The mirror assembly 10 also includes a mirror 14 whose full surface is available since display 20 is mounted to the upper edge of the mirror housing 12. The mirror assembly may also include a garage door opening transmitter as disclosed in the above identified application and for such purpose, a switch 13 is provided on the housing for actuating the garage door opening transmitter. Other switches, 15 and 17, are coupled to the electrical circuitry contained within housing 12 for controlling the compass and mirror as described in detail in the above identified patent application. The mirror 14 may be an electrochromic mirror, an electrically adjustable prism-type mirror or other commercially available mirror which is mounted within housing 12 in a conventional manner and surrounded by a trim bezel 18.

The display 20 includes a reflective target for reflecting information from an alphanumeric vacuum-fluorescent display which is an image source positioned within housing 12 below the display 20 for projecting light upwardly from the vacuum-fluorescent light source to the target which is angled at approximately 45°. The mirror housing integrally includes a lip 22 surrounding the top of the display to provide some shading for the target 24 of the reflective display 20. The difficulty with such reflective displays is illustrated in FIG. 3 which is now described.

Figure 3:
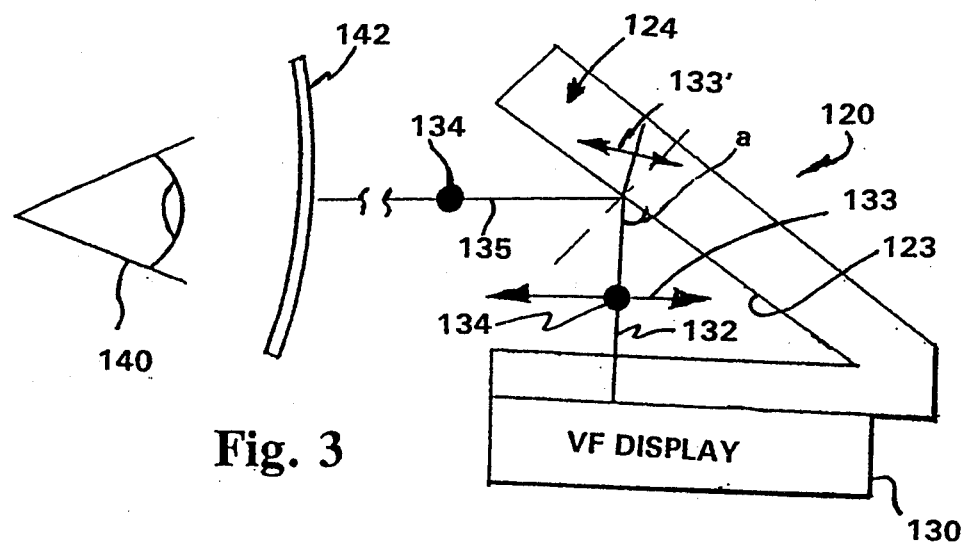
FIG. 3 is a schematic diagram illustrating the problem associated with a reflective display which does not employ the present invention.

In the prior displays 120 shown in FIG. 3, the target 124 was a reflective polymeric material such acrylic or polycarbonate having a substantial thickness, for example, of an eighth of an inch or greater, and which was mounted within the mirror or other housing at an angle of about 45° to reflect information to the viewer. Thus, target 124 was mounted above the mirror 14 in housing 12 and in an optical communication path with a vacuum-fluorescent image source 130 which projects light upwardly as indicated by the light ray 132. The light includes a parallel component 133 and a perpendicular component 134 with the parallel component 133 being shown as a double-headed arrow and the perpendicular component 134 being shown as a large dot. Sometimes the parallel components are also referred to as vertical components and the perpendicular components are sometimes referred to as horizontal components by those skilled in the art. The light emitted from the vacuum-fluorescent display with the two components impinges upon the reflective surface 123 of target 124 at an incident angle 'a' of approximately 45°. Due to the refractive index of acrylic which is approximately 1.49 or the refractive index of polycarbonate which is approximately 1.586, this angle of incidence is very close to Brewster's Angle where maximum polarization takes place. As a result, light reflected as indicated by ray 135 from the target 124 to the eye 140 of an occupant is substantially only the perpendicular component 134 with the parallel component 133 being substantially absorbed by the target 124 as illustrated by arrow 133" in FIG. 3.

When the occupant wears polarized sunglasses, illustrated by lens 142, the polarization of such glasses is designed to block out perpendicular components of light such as the polarized light 134 remaining from the initial unpolarized light ray 132 and therefore, the information projected from the vacuum-fluorescent display 130 is blocked from vision by the viewer's eye 140. Thus, although the display system 120, shown in FIG. 3, provides a high-contrast, visible display for individuals not wearing polarized sunglasses, those wearing polarized sunglasses are unable to view the image reflected from the display target. The serendipitous discovery of the problem with the display such as display 120 is part of the invention as well as the unique solution as set forth in FIGS. 4 and 5.

Figure 4:
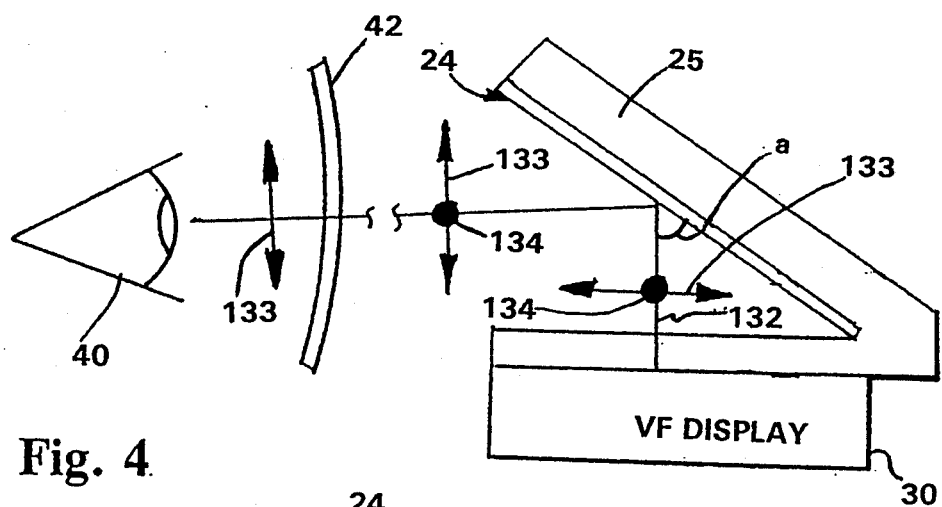
FIG. 4 is a schematic diagram illustrating the structure of the present invention incorporated in the vehicle accessory shown in FIGS. 1 and 2.
Figure 5:
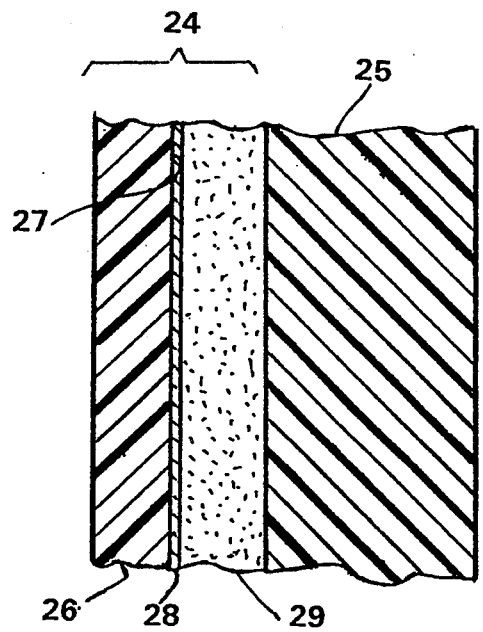
FIG. 5 is a greatly enlarged, cross-sectional view of the target shown in FIG. 4 taken along section lines V—V of FIG. 2.

Referring to the structure illustrated in the diagram of FIG. 4 and the actual target structure shown in FIG. 5, it is to be understood that this structure supplants the target disclosed in the above identified '390 patent application and is oriented in the same manner with respect to the vacuum fluorescent display source 30 as fully disclosed in such patent application, the disclosure of which is incorporated herein by reference. Vacuum fluorescent display 30, like display 130, is a reverse image alphanumeric display which emits a beam 132 of unpolarized light including a parallel component 133 and a perpendicular component 134. This light ray travels in an optical path extending directly from the display 30 to a composite target 24 which is mounted to a support backing structure 25 in turn mounted within the upper lip 22 (FIGS. 1 and 2) of the rearview mirror housing 12 so that the incident light 132 impinges upon target 24 at an angle 'a' of approximately 45°.

The composite target 24 virtually eliminates the polarization experienced by the target 124 of the FIG. 3 structure by providing a thin, transparent, metalized film. In the preferred embodiment, the target 24 includes a Mylar film 26 (FIG. 5) with an integral reflective aluminum layer 28 which is then bonded to the support 25 by an adhesive 29. Composite target 24 polarizes little or none of the parallel component 133 of the transmitted optical image light 132 and, therefore, both the parallel and perpendicular components are transmitted to the viewer's eye 40. Even when polarized sunglasses 42 are employed by the occupant as seen in FIG. 4, the parallel component 133 of the image is still transmitted to the viewer's eye. Thus, although the image intensity may be somewhat diminished, as would be expected when wearing sunglasses, the image is still visible to the occupant even when polarized sunglasses are employed. Further, by not polarizing the light as in the FIG. 3 embodiment, a generally higher intensity image is displayed to vehicle occupants with or without polarized lenses or any sunglasses.

The composite target 24, as briefly noted above, comprises a first layer 26 (FIG. 5) of Mylar film having a 0.6 neutral density tint and a thickness, in a preferred embodiment, of from about 0.001 to 0.005 inch and preferably 0.003 inch. Integrally formed on the rear surface 27 of the Mylar film 26 is a vacuum deposited reflective aluminum layer 28 which forms in effect a mirror for reflecting incident light back through the Mylar film 26 and toward the viewer's eye 40 as seen in FIG. 4. The aluminized layer 28 has a thickness of from approximately 1,000 to 2,000 angstroms and the combination of the aluminized Mylar film can be manufactured by standard vacuum depositing techniques which are well known to those skilled in the art.

Behind the aluminized layer 28 there is provided a bonding adhesive 29 such as conventional, self-adhering pressure sensitive adhesive for attaching the composite target structure 24 to the physical support 25 of the display 20. This support may be the target 124 shown in FIG. 3 and in the previously identified patent application Ser. No. 07/567,390. Thus, the composite target 24 can be added to existing displays, if desired, to provide a higher intensity optical image under all viewing conditions and to eliminate the blocking of the displayed image when the viewer is wearing polarized sunglasses. For such purpose, the adhesive layer 29 is covered with a release paper and the target 24 is cut in a shape to conform to that of the existing display. Although a tinted Mylar film with an aluminized coating was employed in the preferred embodiment, other films, tints and metallization layers could also be employed for different display effects. Also, the reflected display can be used in any environments where high ambient light exists.

These and other applications and modifications of the invention will become apparent to those skilled in the art and will fall within the spirit or scope of the present invention as defined by the appended claims.

The embodiments of the invention in which an exclusive property or privilege is claimed are defined as follows:

1. A vehicle accessory including a reflective display system for projecting an optical image to a viewer from a light emitting source of information to be displayed which projects light along an axis offset from the line-of-sight of the viewer, comprising:
   an accessory housing;
   a light emitting source generating information to be displayed to a viewer, said source mounted within said housing;
   a target member positioned on said housing in spaced relationship to said source and in a viewer's line-of-sight; a highly reflective coating applied to said target member for receiving and reflecting incident light at an angle of about 45° from said light emitting source such that optical energy directed toward a transparent film from said light emitting source is reflected in a viewer's line-of-sight, said target member characteristically acting as a polarizer at said angle of about 45° for polarizing said light from said light emitting source; and
   a tinted transparent film applied to said reflective coating for preventing the polarization of light, said film being tinted whereby said target member and said tinted transparent film present a high contrast, non-polarized display to a viewer.

2. The vehicle accessory as defined in claim 1 wherein said reflective coating is a metalized layer.

3. The vehicle accessory as defined in claim 2 wherein a target support member is mounted at an acute, non-zero angle to said source.

4. The vehicle accessory as defined in claim 3 including a self-sticking pressure sensitive adhesive layer on said metalized layer for adhering said metalized layer to a support member on said housing.

5. The vehicle accessory as defined in claim 4 wherein said tinted film is a polyester film with a thickness of from 0.001 to 0.005 inch.

6. The vehicle accessory as defined in claim 5 wherein said metalized film comprises aluminium.

7. The vehicle accessory as defined in claim 6 wherein said source is a vacuum-fluorescent display.

8. A reflective display for reflecting unpolarized light from a light emitting display source in a rearview mirror to a viewer and for preventing significant polarization of such light such that viewers wearing polarized sunglasses can view the display information, comprising:
   a target member including a surface oriented at about 45° to the light from the light emitting display source;
   a tinted transparent film;
   a reflective metal coating on one side of said tinted film, said reflective metal coating characteristically acting as a polarizer at said angle of about 45° for polarizing the light from said light emitting display source, but said tinted transparent film characteristically preventing the polarization of light at said angle; and
   a self-sticking, pressure sensitive adhesive layer on said metal coating for mounting one side of said film to said surface of said target member in the rearview mirror such that light reflects from said metal coating through said tinted film to a viewer without being polarized thereby.

9. The display as defined in claim 8 wherein said tinted film comprises a tinted polyester film with a thickness of from about 0.001 to 0.005 inches.

10. The display as defined in claim 9 wherein said metal coating comprises aluminium vacuum deposited on said tinted polyester film.

11. A vehicle accessory assembly having a reflective target for projecting an optical image display to a viewer using a light emitting source positioned behind a rearview mirror and a target positioned on a rearview mirror housing, comprising:
    accessory housing;
    a light emitting source of information to be displayed, said light emitting source mounted within said housing;
    target member mounted on said housing in spaced, aligned relationship to said light emitting source and including a highly reflective surface for reflecting optical energy directed toward said target from said light emitting source in line with a viewer's line-of-sight, said highly reflective surface being oriented at about 45° to the light emitted from said light emitting source, said angle causing said target member to characteristically act as a polarizer for polarizing light from said light emitting source; and
    a transparent tinted layer of material positioned between said light emitting source and said target means for increasing the contrast of the displayed image such that a non-polarized optical energy is reflected from said target to present a high contrast display for viewing by an occupant of the vehicle.

12. The vehicle accessory assembly as defined in claim 11 wherein said housing includes a target backing support for mounting said target member at an angle to said source.

13. The vehicle accessory assembly as defined in claim 12 wherein said reflective surface is a metalized film.

14. The vehicle accessory assembly as defined in claim 13 wherein said source is a vacuum fluorescent display.

15. A rearview mirror assembly for a vehicle, comprising:
   a rearview mirror housing;
   a rearview mirror attached to the housing in a location so that, when mounted in a vehicle, a person operating the vehicle can see images behind the vehicle by looking at said rearview mirror;
   a light emitting source mounted in said housing behind said rearview mirror for generating display information in the form of a pattern of light to be displayed to the person operating the vehicle; and
   a reflector positioned on said housing for reflecting the pattern of light from said light emitting source toward the person at an angle of about 45° to said reflector so that the display information can be seen, the reflector being made of a material which characteristically polarizes light reflected therefrom at said angle of about 45°, and means covering said reflector to prevent the polarization of the reflected pattern of light so that a person, when wearing polarized sunglasses, can still see the pattern of light and read the display information.

* * * * *